United States Patent
Schumacher

(10) Patent No.: US 11,247,623 B2
(45) Date of Patent: Feb. 15, 2022

(54) BOLT-ON BUMPER WITH ADJUSTABLE EXTENSIONS

(71) Applicant: Deist Industries, Inc., Hadley, PA (US)

(72) Inventor: Andrew Schumacher, Cranberry Township, PA (US)

(73) Assignee: DEIST INDUSTRIES, INC., Hadley, PA (US)

(*) Notice: Subject to any disclaimer, the term of this patent is extended or adjusted under 35 U.S.C. 154(b) by 253 days.

(21) Appl. No.: 16/774,487

(22) Filed: Jan. 28, 2020

(65) Prior Publication Data

US 2020/0238936 A1 Jul. 30, 2020

Related U.S. Application Data

(60) Provisional application No. 62/798,802, filed on Jan. 30, 2019.

(51) Int. Cl.
*B60R 19/18* (2006.01)
*B60R 19/02* (2006.01)
*B60R 19/24* (2006.01)
*B60R 19/04* (2006.01)
*B60R 19/50* (2006.01)
*B60D 1/56* (2006.01)
*B60D 1/52* (2006.01)

(52) U.S. Cl.
CPC ............... *B60R 19/18* (2013.01); *B60D 1/52* (2013.01); *B60D 1/56* (2013.01); *B60R 19/023* (2013.01); *B60R 19/04* (2013.01); *B60R 19/24* (2013.01); *B60R 19/50* (2013.01); *B60R 2019/1806* (2013.01); *B60R 2019/505* (2013.01)

(58) Field of Classification Search
CPC ....... B60R 19/18; B60R 19/023; B60R 19/24; B60R 19/04; B60R 2019/1806; B60R 2019/505; B60R 19/50; B60D 1/56; B60D 1/52
See application file for complete search history.

(56) References Cited

U.S. PATENT DOCUMENTS

| 1,473,288 | A  | * | 11/1923 | Gould | ................... | B60R 19/023 280/415.1 |
| 9,387,888 | B2 | * | 7/2016 | Schmeichel | ......... | B62D 25/188 |
| 9,937,883 | B2 | * | 4/2018 | Dagrossa | ................ | B60R 19/44 |
| 2018/0178850 | A1 | * | 6/2018 | Schmeichel | ............. | B60D 1/58 |

* cited by examiner

*Primary Examiner* — D Glenn Dayoan
*Assistant Examiner* — Melissa Ann Bonifazi
(74) *Attorney, Agent, or Firm* — Emerson, Thomson & Bennett, LLC; Roger D. Emerson

(57) ABSTRACT

Provided herewith is a customizable bumper system for a vehicle and a related method of customizing. The customizable bumper system includes a central weldment that bolts onto a frame of the vehicle. The central weldment includes a height adjustable hitch receiver attachment structure in the form of an array of parallel holes for attaching a hitch receiver at a selected hitch height position along the central weldment. The central weldment also includes a pair of height adjustable extension attachment structures in the form of arrays of parallel holes for selectively attaching a respective pair of lateral bumper extension members upon which one or more selected light components are optionally installed. These lateral bumper extension members are also attached at a selected extension height position. Additional component attachment structures enable one aftermarket components to be optionally installed upon the central weldment.

16 Claims, 4 Drawing Sheets

BOLT-ON BUMPER WITH ADJUSTABLE EXTENSIONS

This application claims the benefit of U.S. Provisional Application No. 62/798,802, entitled BOLT-ON BUMPER WITH ADJUSTABLE EXTENSIONS, filed Jan. 30, 2019, which is fully incorporated herein by reference.

BACKGROUND

A. Field of the Invention

The present invention relates to the field of aftermarket components for vehicles. In particular, the present invention relates to the field of custom crafted aftermarket bumpers for retrofitting onto trucks.

B. Description of Related Art

Vehicles such as trucks are typically sold with standard features or option packages including additional components for performing various functions. Often, such features are not sufficient for the specific needs or desires of a particular vehicle end user.

Custom vehicle upfitting is performed upon existing vehicles to add improved components or additional features to increase the functionality and performance of a vehicle to suit the needs and desires of the end user. Upfitting is an aftermarket process in which non-factory service companies and personnel (generally known as upfitters) customize existing vehicles by installing upgraded equipment to improve performance.

There is a market perception that upfitters prefer to build their own bumper systems than to purchase and modify an existing commercially available unit. However, custom crafting of a bumper can take a great deal of time, resulting in considerable expense to the consumer. Also, since customized upfitter bumpers can be considered "home-made," such bumpers have no engineering documentation or testing to verify that they meet the standards of regulatory authorities such as the Interstate Commerce Commission (ICC), the Federal Motor Carrier Safety Administration (FMCSA) and the Society of Automotive Engineers (SAE). Thus, there can be a higher potential for liability with a common type of customized upfitter bumper.

In addition, prior upfitter bumper solutions are typically welded onto the vehicle chassis. This results in additional work and expense at the time of installation as well as if further upfitting customization is required in which the bumper is removed and reattached. Further, prior upfitter bumper solutions do not provide adjustability of the customized components, nor do they provide convenient hitch options.

II. SUMMARY

Provided in this disclosure is a customizable bumper system for a vehicle and a related method of customizing. The customizable bumper system includes a central weldment that bolts onto a frame of the vehicle. The central weldment includes a height adjustable hitch receiver attachment structure in the form of an array of parallel holes for attaching a hitch receiver at a selected hitch height position along the central weldment. The central weldment also includes a pair of height adjustable extension attachment structures in the form of arrays of parallel holes for selectively attaching a respective pair of lateral bumper extension members upon which the stop, tail, turn, and reverse combination light is installed. These lateral bumper extension members are also attached at a selected extension height position. Additional component attachment structures enable one or more aftermarket components to be optionally installed upon the central weldment.

In accordance with one aspect of the present invention, a method is provided herewith for further extending custom vehicle upfitting to add improved components or additional features to increase the functionality and performance of a vehicle to suit the needs and desires of the end user.

In accordance with another aspect of the present invention, a customized upfitter bumper is provided herewith for complying with engineering criteria and testing to meet the standards of regulatory authorities such as the interstate Commerce Commission (ICC), the Federal Motor Carrier Safety Administration (FMCSA) and the Society of Automotive Engineers (SAE).

In accordance with still another aspect of the present invention, a customized upfitter bumper is provided herewith for reducing the liability commonly associated with common types of customized upfitter bumpers.

In accordance with yet another aspect of the present invention, a customized upfitter bumper is provided herewith that can be removed and reattached, reducing the work and expense associated with upfitting customization.

In accordance with a further aspect of the present invention, a customized upfitter bumper is provided herewith that provides adjustability of the customized components and convenient hitch options.

In accordance with another further aspect of the present invention, a customized upfitter bumper is provided herewith that reduces the time required for custom crafting of an upfitted bumper, resulting in considerable savings to the consumer.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
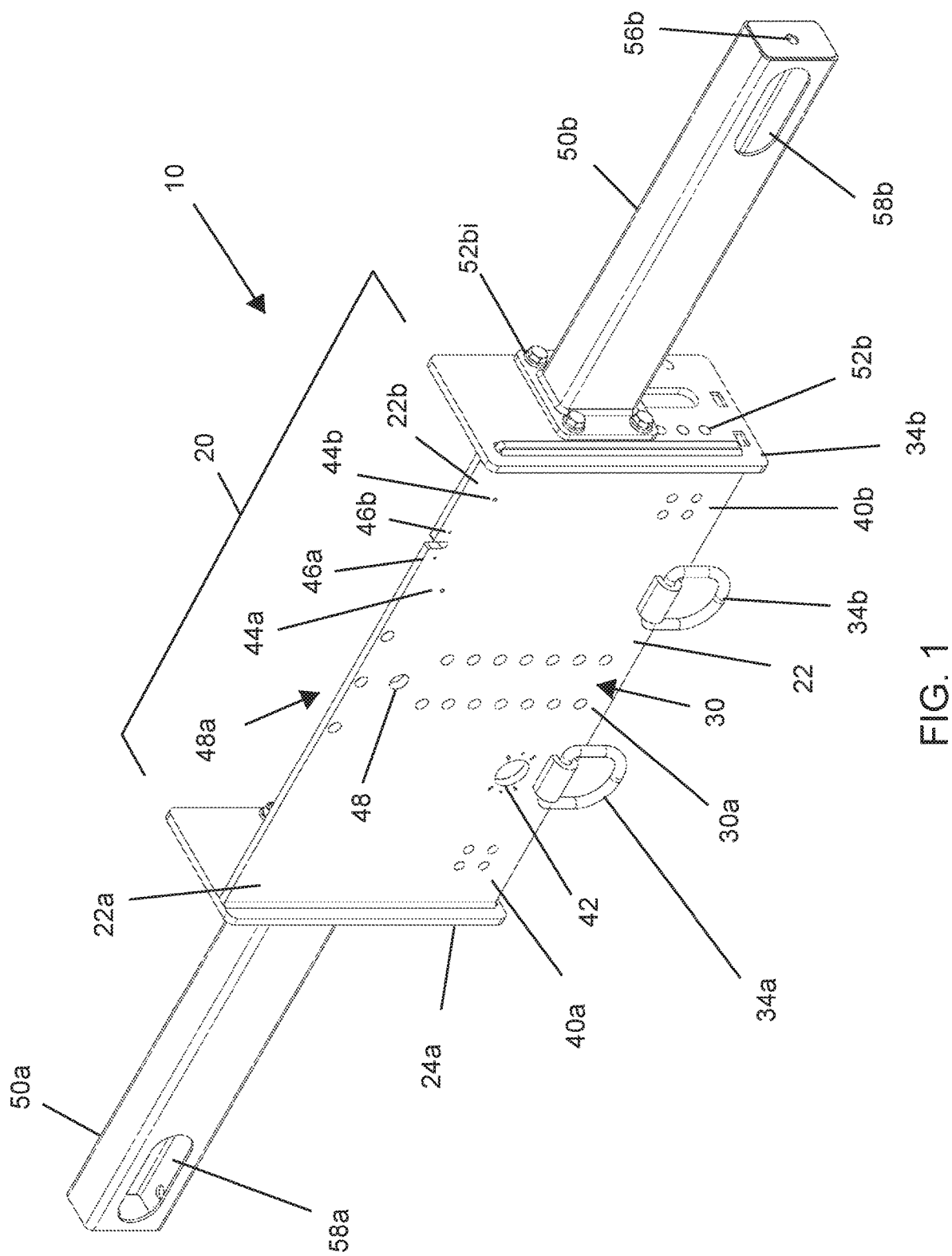
FIG. 1 is a front perspective view of a customizable bolt-on bumper in accordance with an exemplary embodiment of the present invention.

Referring now to the drawings wherein the showings are for purposes of illustrating embodiments of the invention only and not for purposes of limiting the same, and wherein like reference numerals are understood to refer to like components, FIG. 1 shows a perspective view of a customizable bumper system 10 in the form of an after-market rear bumper for installation on commercial over-the-road trucks. In the preferred embodiment, the bumper system 10 can be employed on trucks having a US gross vehicle weight rating (GVWR) of Class 3 to Class 7 (medium to heavy trucks). However, it is to be appreciated that the present bumper system 10 has applicability to other types of trucks and other vehicles, all without departing from the invention.

The present customizable bumper system 10 provides optional modifications for bumper extension height and hitch height, tailored to the needs of an individual end user. The present bumper system 10 provides a provision for a rear camera system and provision for selected placement of license plates. Contrary to typical prior art bumpers that are welded to the truck chassis, the present bumper system 10 has provisions for being bolted to the truck chassis, which enables the customized bumper system 10 to be easily moved to another new truck. The present invention also makes installation of the rear bumper simpler and faster and provides height flexibility of the bumper extensions and hitch mounting points.

As shown in the FIG. 1, the customizable bumper system 10 for a vehicle includes a central weldment 20 adapted to bolt onto a frame of the vehicle. The central weldment 20 is preferably formed by a generally flat central member 22, which can be a metal plate (i.e., a steel plate). The central member 22 is configured to substantially abut the frame 12 of the vehicle, as indicated in the exploded view of FIG. 3.

The central weldment 20 also includes a generally flat first side member 24a attached substantially perpendicularly to a first side 22a of the central member 22. The central weldment 20 additionally includes a generally flat second side member 24b attached substantially perpendicularly to a second side 22b of the central member 22, which is opposite from the first side 22a of the central member 22, where the first and second side members 24a, 24b can be edges of the central member 22.

Figure 4:
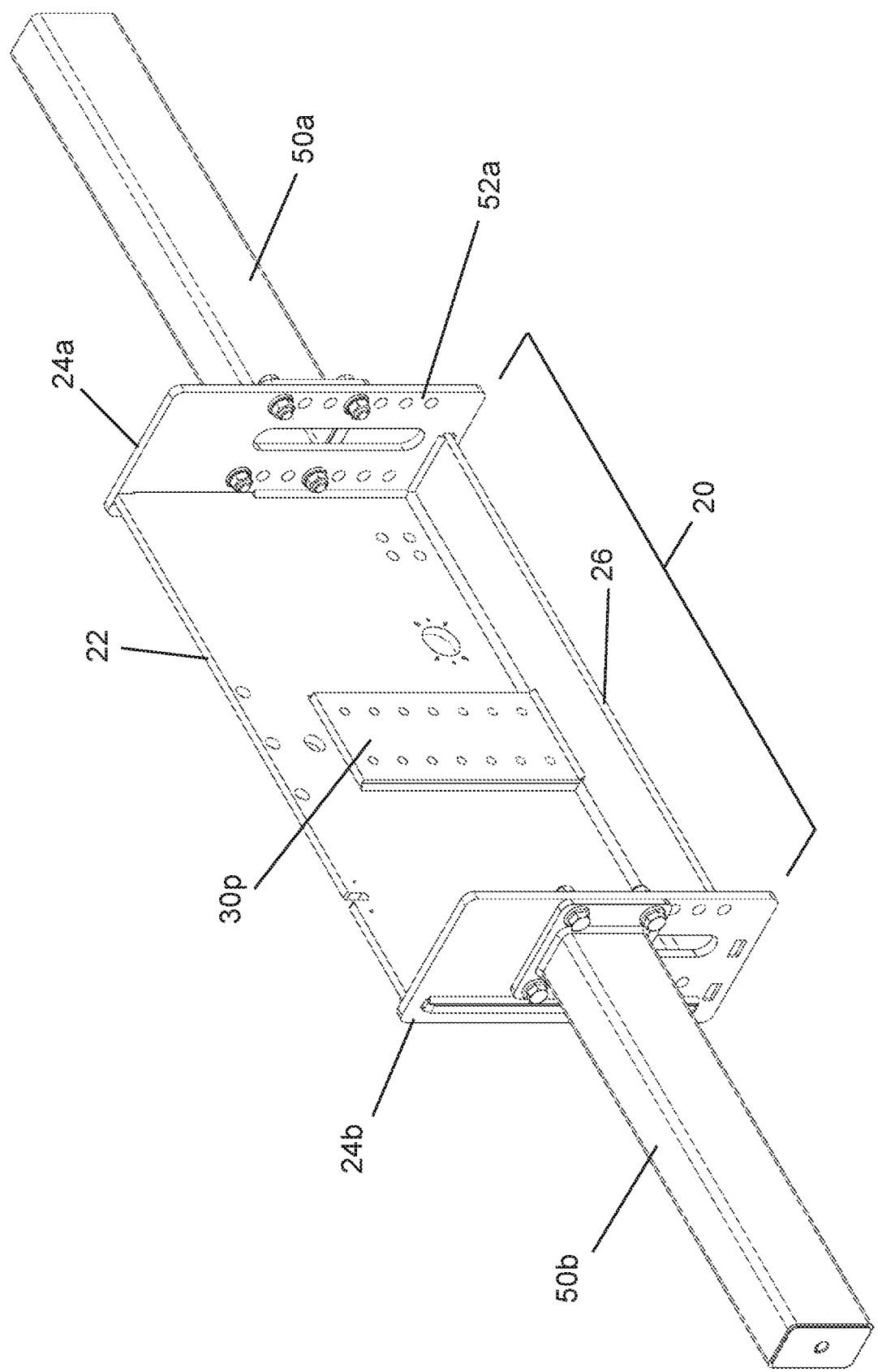
FIG. 4 is a rear perspective view of a customizable bolt-on bumper in accordance with an exemplary embodiment of the present invention.

As shown in the rear view of FIG. 4, the central weldment 20 also includes a transverse reinforcement member 26 which attaches to a bottom edge of the central member 22 and spans the first and second side members 24a, 24b. The reinforcement member 26 adds mechanical strength to the central weldment 20, resulting in a rigid structure. In this manner, the central weldment 20 with the reinforcement member 26 complies with SAE load requirements.

Figure 2:
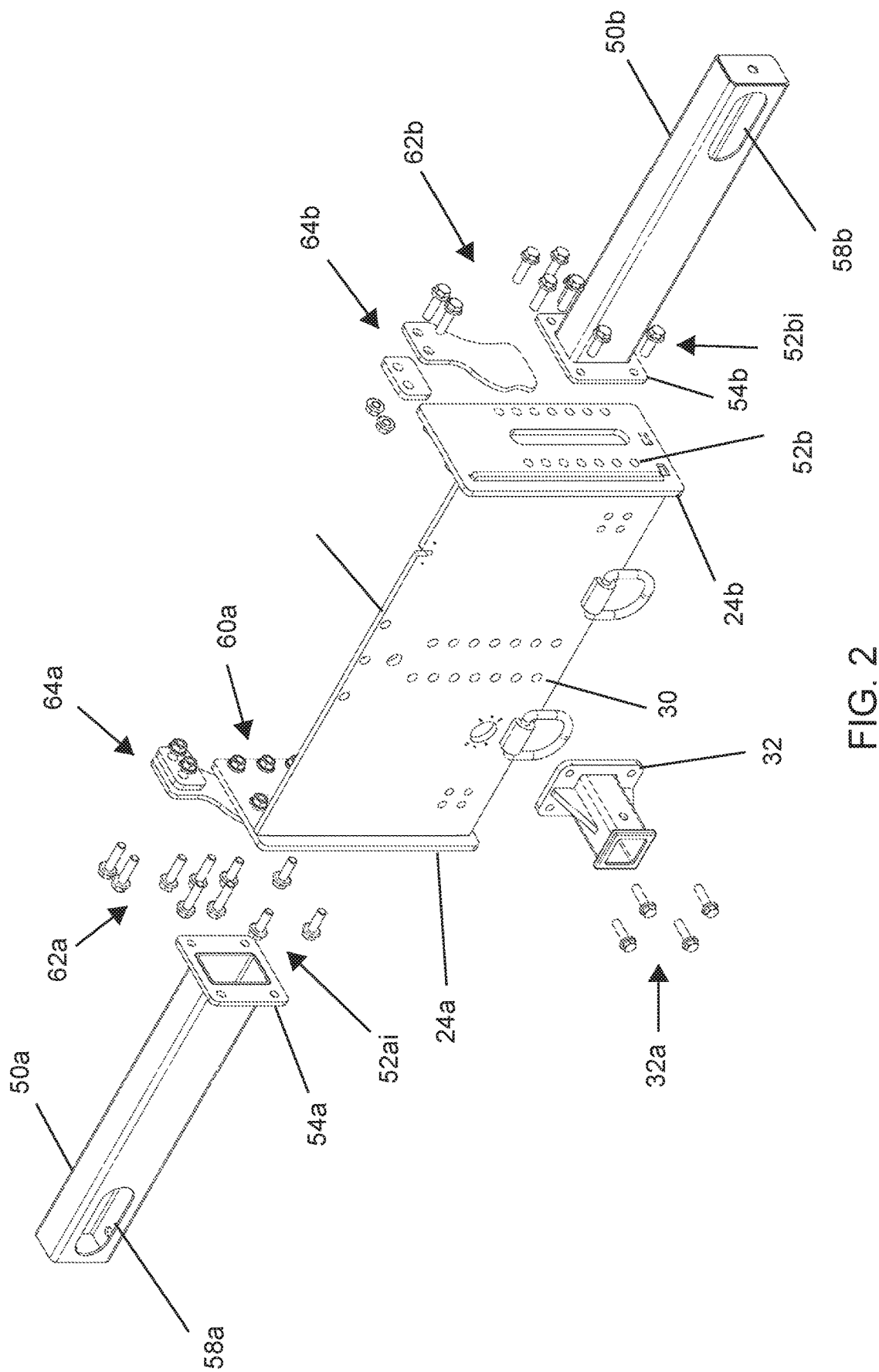
FIG. 2 is an exploded perspective view showing relative relationships of the parts of the customizable bolt-on bumper in accordance with an exemplary embodiment of the present invention.
Figure 3:
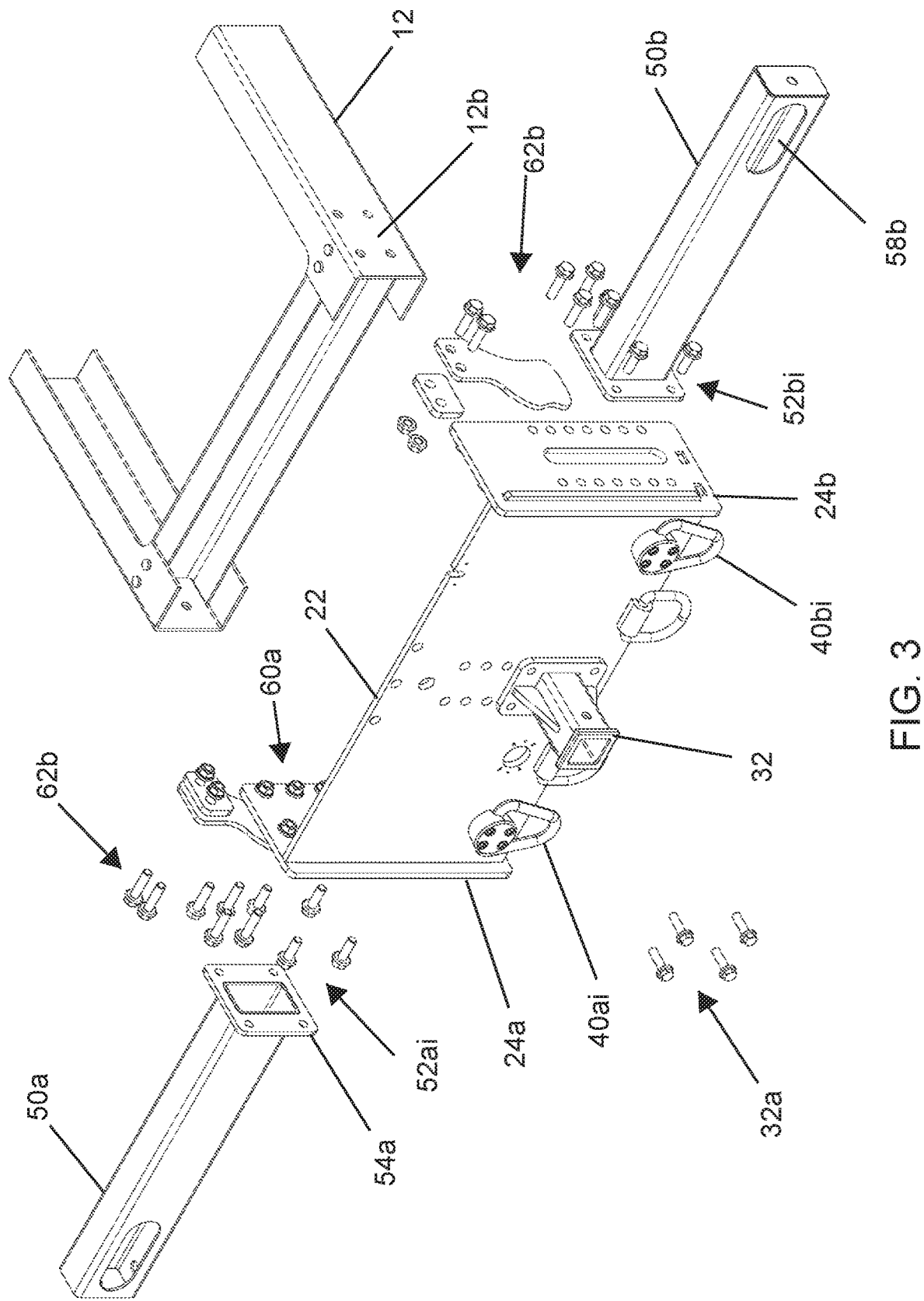
FIG. 3 is an exploded perspective view of the customizable bolt-on bumper including customizable features in accordance with an exemplary embodiment of the present invention.

Referring particularly to FIGS. 1, 2, and 3, the central weldment 20 also includes a height adjustable hitch receiver attachment structure 30 for attaching a hitch receiver 32 at a selected hitch height position along the central weldment 20. The central weldment 20 also includes one or more component attachment structures 40, 42, 44, 46, 48 (described in detail hereinbelow) upon which one or more respective aftermarket components are selectively installed upon the central weldment 20. In particular, it is the central member 22 of the central weldment 20 that includes the height adjustable hitch receiver attachment structure 30 and the one or more component attachment structures 40, 42, 44, 46, 48.

In the preferred embodiment, the height adjustable hitch receiver attachment structure 30 generally includes an array 30a of parallel bolt holes formed at different positions upon a surface of the central member 22. As depicted in FIG. 1, there can be six parallel rows of two holes. The array 30a of hitch receiver attachment bolt holes can be pre-drilled holes formed at suitable locations on the central member 22. However, any array 30a having any desired number and location of hitch receiver attachment holes can be contemplated without departing from the invention. Moreover, any suitable attachment structure other than bolt holes could also be contemplated without departing from the invention.

As depicted in FIGS. 2 and 3, the hitch receiver 32 is secured to the central member 22 by a plurality of bolts 32a selectively bolted into a subset of attachment holes of the array 30a to define the selected height of the hitch receiver 32. As indicated in the figures, four bolts 32a can be used to attach the hitch receiver 32 to the central member 22, one in each of the four corners. The holes of the array 30a are spaced so that the hitch receiver 32 can be mounted in any four selected holes up or down the array 30a so that different heights of the hitch receiver 32 can be selected. The holes can be machined to smooth bored holes that the bolts 32a pass through to engage threads tapped into a tapped back plate 30p on an opposite side of the central member 22, as shown in FIG. 4. Alternatively, any other suitable means of engaging the bolts 32a can also be employed without departing from the invention. It is to be appreciated that the hitch receiver 32, once mounted, can receive a ball hitch for towing a trailer or other suitable component. The hitch receiver 32 allows for custom placement of hitches or other appurtenances.

As especially shown in FIG. 1, the central member 22 includes component attachment structures 40, 42, 44, 46, 48 upon which respective aftermarket components are selectively installed upon the central weldment 20. The attachment structures 40, 42, 44, 46, 48 are preferably pre-drilled bolt holes, but could also be any other suitable attachment structure without departing from the invention.

As indicated in FIG. 1, a pair of standard D rings 34a, 34b are welded to the central member 22 as a standard feature, for attaching a trailer safety chain (not shown) to accompany pulling a 20,000 lb. trailer. Optional heavy-duty D rings 40ai, 40bi can also be employed for less common situations that require the capacity to pull a 40,000 lb. trailer. Thus, first and second arrays 40a, 40b of bolt holes are formed in the central member 22. As indicated in FIG. 3, these arrays 40a, 40b can enable the supplementary heavy-duty rings 40ai, 40bi to be bolted onto the central member 22. These supplementary D rings 40ai, 40bi can be used for attaching the trailer safety chain for anchoring a trailer during the use of a trailer ball hitch received in the hitch receive 32 for pulling a 40,000 lb. trailer.

FIG. 1 further shows that the central member 22 also includes a component attachment structure in the form of a trailer light system socket 42. This can be a pre-drilled hole for admitting a conducting wire with suitable connector for connecting to a taillight and turn signal for a trailer connected to a hitch in the hitch receiver 32. As indicated, the socket 42 can also include a plurality of associated holes around its periphery to attach and secure a grommet for the conducting wire or an electrical connector.

FIG. 1 additionally shows that the central member 22 further includes a component attachment structure in the form of pre-drilled holes 44a, 44b for installation of a license plate or a license plate holder. The holes 44a, 44b respectively hold the right and left sides of the license plate and are mirrored across a notch in the top of the central member 22. The central member 22 further includes a component attachment structure in the form of pre-drilled holes 46a, 46b, also mirrored across the notch in the top of the central member 22, for installation of a license plate light for illuminating a license plate.

As also depicted in FIG. 1, the central member 22 further includes a component attachment structure in the form of a pre-drilled hole 48 for installation of a rear-view camera. There is also shown a set of three holes 48a that can be used for the 3 light cluster or CHIMSL (Center High Mounted Stop Lamps). Common three penny lights can be inserted into the three holes 48a which are then supported by grommets.

The lateral bumper extension members 50a, 50b will now be discussed in connection with FIGS. 1, 2, 3, and 4. As explained hereinabove, the customizable bumper system 10 includes the central weldment 20 that bolts onto a frame of the vehicle. The central weldment 20 includes the central member 22 and the first side member 24a attached substantially perpendicularly to a first side 22a of the central member 22. The central weldment 20 also includes the second side member 24b attached substantially perpendicularly to a second side 22b of the central member 22, which is opposite from the first side 22a of the central member 22.

The first and second side members 24a, 24b of the central weldment 20 include respective height adjustable extension attachment structures 52a, 52b for selectively attaching to first and second lateral bumper extension members 50a, 50b upon which one or more selected light components are optionally installed at a selected location (as will be explained in detail hereinbelow).

The first side member 24a includes a first height adjustable extension attachment structure for selectively attaching a first lateral extension member 50a. As more clearly indicated in the figures, the second side member 24b includes a second height adjustable extension attachment structure for selectively attaching a second lateral bumper extension member 50b. It is to be appreciated that the side members 24a, 24b and the associated structures are mirror symmetric and both sides include similar corresponding configurations so that details of one side are not explicitly revealed in the figures, it is understood to be to substantially identical to the details of the illustrated side.

The first and second height adjustable extension attachment structures are each preferably defined by a respective array 52a, 52b of parallel extension attachment bolt holes formed at different positions upon a surface of the respective side members 24a, 24b. As best seen in the exploded view of FIG. 2, the arrays 52a, 52b can be pre-drilled holes formed at suitable locations on the respective side members 24a, 24b. However, any array 52a, 52b having any desired number and location of extension attachment holes can be contemplated without departing from the invention. Moreover, any suitable attachment structure other than bolt holes could also be contemplated without departing from the invention.

As depicted in FIGS. 2 and 3, the first and second lateral bumper extension members 50a, 50b are secured to their respective side members 24a, 24b by respective pluralities of bolts 52ai, 52bi selectively bolted into a subset of attachment holes of the respective arrays 52a, 52b to define the selected height of each of the first and second lateral bumper extension members 50a, 50b. As indicated in the figures, four bolts 52ai, 52bi can be used to attach the each of the first and second lateral bumper extension members 50a, 50b to the respective side member 24a, 24b.

The holes of each array 52a, 52b are spaced so that the respective lateral bumper extension members 50a, 50b can be mounted in any set of selected holes up or down the array 52a, 52b so that different heights of the lateral bumper extension members 50a, 50b can be selected. The holes can be machined to include tapped threads for receiving the bolts directly, or they can be smooth bored to that the bolts are threaded into nuts on the back of the respective side members 24a, 24b. The bumper extension members 50a, 50b each include a flange 54a, 54b having pre-drilled holes for receiving the bolts 52ai, 52bi for attachment to the respective side members 24a, 24b.

The bumper extension members 50a, 50b each include mounting holes for installing light components. The ends of the bumper extension members 50a, 50b each include a rear side marker mounting hole 56a, 56b for mounting a rear side marker light. A front-facing portion of each of the bumper extension members 50a, 50b include a reverse light mounting hole 58a, 58b for mounting reverse lights. The mounting holes of the bumper extension members 50a, 50b can also be used for mounting rear running lights or stop/turn lights.

The central weldment 20 of the customizable bumper system 10 is specially configured to receive and retain a wiring harness that connects directly to the vehicle light system of common brand trucks, for powering one or more the selected light components, thereby speeding installation significantly.

As particularly shown in FIGS. 1, 2, and 3, the side plates 24a, 24b of the central weldment 20 are configured to bolt to the frame 12 of the truck. The side plates 24a, 24b each include an array 60a, 60b of pre-drilled bolt holes for receiving respective bolts 62a, 62b that penetrate through to associated pre-drilled holes 12a, 12b on the frame 12. In this manner, the central securement 20 is removably secured onto the frame 12 of the vehicle. Optionally, spacer plates 64a, 64b can be added to the inside of the central weldment 20 to take up additional space and thereby accommodate narrower truck frames.

As described herein, the center weldment 20 of a customized bumper system 10 is drilled with arrays of holes to provide vertical bumper extension adjustability for the end user. Other types of bumpers as known in the prior art have no such vertical adjustability. The center weldment 20 also provides an array of holes for vertical adjustment of a 40,000 lb. hitch receiver. Other components can be drilled and cut for installation of rear running/signal lights. None of the prior art bumpers provide this convenience. These features reduce installation time significantly and provides new levels of flexibility to end users in diversified areas where the addition of adjustable bumpers would be advantageous.

A method of customizing a bumper system for a vehicle is now described herewith. A central weldment is provided including a height adjustable hitch receiver attachment structure and one or more height adjustable extension attachment structures. A hitch receiver is attached to the hitch receiver attachment structure at a selected hitch height position along the central weldment. One or more respective lateral bumper extension members are attached to the adjustable extension attachment structures at a selected extension height position. One or more selected light components are installed to a selected location on the respective lateral bumper extension members. After customizing the bumper system in this manner, the central weldment is bolted onto a frame of the vehicle.

The aforementioned method can also include additional features. For example, in the providing of the central weldment, a specific type of central weldment can be provided having one or more component attachment structures for attaching one or more aftermarket components. The aftermarket components can be selected from a license plate alone or mounted in a mounting frame, a license plate light for illuminating the license plate, a rear-view camera, or a D-ring for attaching a towing chain.

The aforementioned method can be implemented in certain specific aspects. For example, in the providing of the central weldment, the height adjustable hitch receiver attachment structure can be formed onto a generally flat central member of the central weldment. The forming of one or more height adjustable extension attachment structures can include forming a first height adjustable extension attachment structure onto a generally flat first side member and forming a second height adjustable extension attachment structure onto a generally flat second side member. The first side member is attached substantially perpendicularly to a first side of the central member and the second side member is attached substantially perpendicularly to a second side of the central member, opposite the first side of the central member.

A first lateral extension member is then selectively attached at a first selected extension height position while a second lateral extension member is selectively attached at a second selected extension height position. In the preferred embodiment, both the first and second selected extension height positions are the same, but they each can be attached at different selected extension height positions without departing from the invention. Afterwards, the central member is configured to substantially abut the frame of the vehicle.

In the aforementioned methodologies discussed hereinabove, it is preferred that the forming of the height adjustable hitch receiver attachment structure is performed by forming an array of parallel central attachment holes at different positions upon a surface of the central weldment. Afterwards, the hitch receiver is secured by selectively bolting a plurality of bolts into a subset of central attachment holes to define the selected hitch height. However, it is to be appreciated that any other sort of height adjustable hitch receiver attachment structure can be formed by any other method without departing from the invention.

In the aforementioned methodologies discussed hereinabove, it is preferred that the forming of one or both of the first or second height adjustable extension attachment structures is performed by forming an array of parallel extension attachment holes at positions upon the surface of the respective side member. Afterwards, the respective lateral bumper extension member is secured by selectively bolting a plurality of bolts into a subset of extension attachment holes to define the selected extension height. However, it is to be appreciated that any other sort of height adjustable extension attachment structure can be formed by any other method without departing from the invention.

The method includes steps of installing one or more selected light components upon one or both of the one respective lateral bumper extension member. Such installing can include optionally installing one or more of a rear side marker light, a rear running light, a stop/turn light, or a reverse light. Moreover, the present method can also include installing onto the central weldment a wiring harness and including a further step of connecting the wiring harness directly to a vehicle light system, for powering the at least one selected light component.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A customizable bumper system for a vehicle, comprising:
   a central weldment adapted to bolt onto a frame of the vehicle, wherein the central weldment further comprises:
     a height adjustable hitch receiver attachment structure for attaching a hitch receiver at a selected hitch height position along the central weldment;
     at least one height adjustable extension attachment structure for selectively attaching at least one respective lateral bumper extension member upon which at least one selected light component is installed at a selected location, wherein the at least one respective lateral bumper extension member is attached at a selected extension height position; and
     at least one component attachment structure upon which at least one respective aftermarket component is selectively installed upon the central weldment.

2. The customizable bumper system of claim 1, wherein the central weldment comprises:
   a generally flat central member configured to substantially abut the frame of the vehicle, wherein the central member includes the height adjustable hitch receiver attachment structure and the at least one component attachment structure;
   a generally flat first side member attached substantially perpendicularly to a first side of the central member, wherein the first side member includes a first height adjustable extension attachment structure for selectively attaching a first lateral extension member; and
   a generally flat second side member attached substantially perpendicularly to a second side of the central member, opposite from the first side of the central member, wherein the second side member includes a second height adjustable extension attachment structure for selectively attaching a second lateral bumper extension member.

3. The customizable bumper system of claim 2, wherein the height adjustable hitch receiver attachment structure comprises an array of parallel central attachment holes formed at different positions upon a surface of the central member, whereupon the hitch receiver is secured to the central member by a plurality of bolts selectively bolted into a subset of attachment holes to define the selected height.

4. The customizable bumper system of claim 2, wherein at least one of the first or second height adjustable extension attachment structures comprise an array of parallel extension attachment holes formed at different positions upon a surface of the respective side member, whereupon the respective lateral bumper extension member is secured to the respective side member by a plurality of bolts selectively bolted into a subset of extension attachment holes to define the selected height.

5. The customizable bumper system of claim 1, wherein the at least one selected light component installed upon the at least one respective lateral bumper extension member comprises at least one of:
   a rear side marker light;
   a rear running light;
   a stop/turn light; or
   a reverse light.

6. The customizable bumper system of claim 1, wherein the at least one aftermarket component comprises at least one of:
   a license plate mounting frame;
   a license plate light;
   a rear view camera; or
   a D-ring for attaching a towing chain.

7. The customizable bumper system of claim 1, wherein the central weldment is configured to receive and retain a wiring harness that connects directly to a vehicle light system, for powering the at least one selected light component.

8. The customizable bumper system of claim 1, wherein the central weldment further comprises at least one bolt hole for receiving a bolt for removably securing the central weldment onto the frame of the vehicle.

9. A method of customizing a bumper system for a vehicle, comprising:
   providing a central weldment including a height adjustable hitch receiver attachment structure and at least one height adjustable extension attachment structure;
   attaching a hitch receiver to the hitch receiver attachment structure at a selected hitch height position along the central weldment;
   attaching at least one respective lateral bumper extension member to the at least one height adjustable extension attachment structure at a selected extension height position;
   installing at least one selected light component to a selected location on the at least one respective lateral bumper extension member; and
   bolting the central weldment onto a frame of the vehicle.

10. The method of claim 9, wherein the providing of the central weldment further comprises providing a central weldment having at least one component attachment structure for attaching at least one aftermarket component.

11. The method of claim 10, further comprising attaching at least one aftermarket component to the at least one component attachment structure selected from:
   a license plate mounting frame:
   a license plate light;
   a fear view camera; or
   a D-ring for attaching a towing chain.

12. The method of claim 10, wherein the providing of the central weldment comprises:
   forming the height adjustable hitch receiver attachment structure onto a generally flat central member of the central weldment;
   forming a first height adjustable extension attachment structure onto a generally flat first side member;
   forming a second height adjustable extension attachment structure onto a generally flat second side member;
   attaching the first side member substantially perpendicularly to a first side of the central member;
   attaching the second side member substantially perpendicularly to a second side of the central member, opposite the first side of the central member;
   selectively attaching a first lateral extension member at a first selected extension height position;
   selectively attaching a second lateral extension member at a second selected extension height position; and
   configuring the central member to substantially abut the frame of the vehicle.

13. The method of claim 12, wherein the forming of the height adjustable hitch receiver attachment structure comprises forming an array of parallel central attachment holes at different positions upon a surface of the central weldment, further comprising a step of securing the hitch receiver by selectively bolting a plurality of bolts into a subset of central attachment holes to define the selected hitch height.

14. The customizable bumper system of claim 13, wherein the forming of the at least one of the first or second height adjustable extension attachment structures comprises forming an array of parallel extension attachment holes at positions upon a surface of the respective side member, further comprising a step of securing the respective lateral bumper extension member by selectively bolting a plurality of bolts into a subset of extension attachment holes to define the selected extension height.

15. The method of claim 10, wherein the installing of the at least one selected light component upon the at least one respective lateral bumper extension member comprises optionally installing at least one of:
   a rear side marker light;
   a rear running light;
   a stop/turn light; or
   a reverse light.

16. The method of claim 10, further comprising installing onto the central weldment a wiring harness and connecting the wiring harness directly to a vehicle light system, for powering the at least one selected light component.

\* \* \* \* \*